Nov. 7, 1939.　　　H. POLECK　　　2,178,645
MEASURING ARRANGEMENT FOR POTENTIAL TRANSFORMERS
Filed Aug. 9, 1937
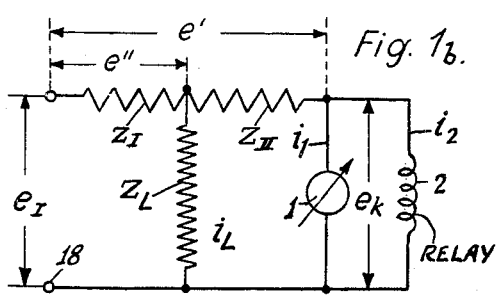
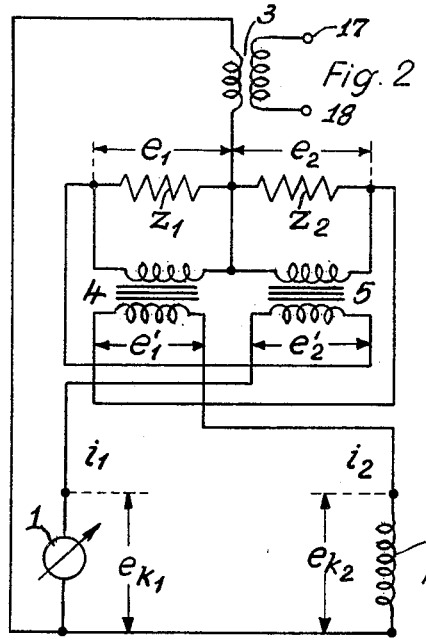
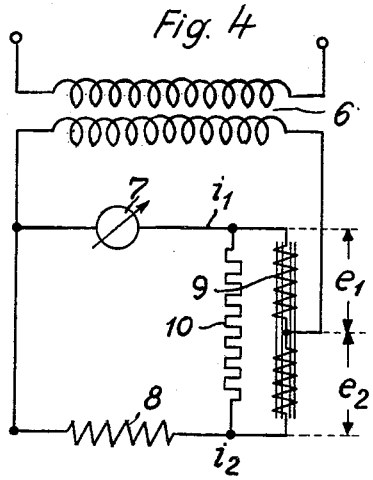
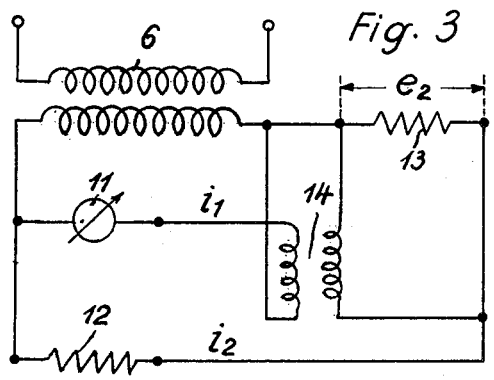
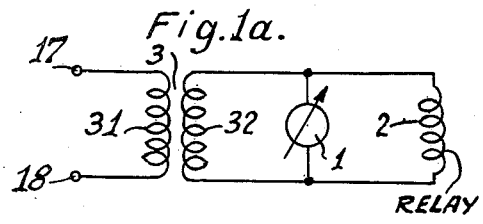
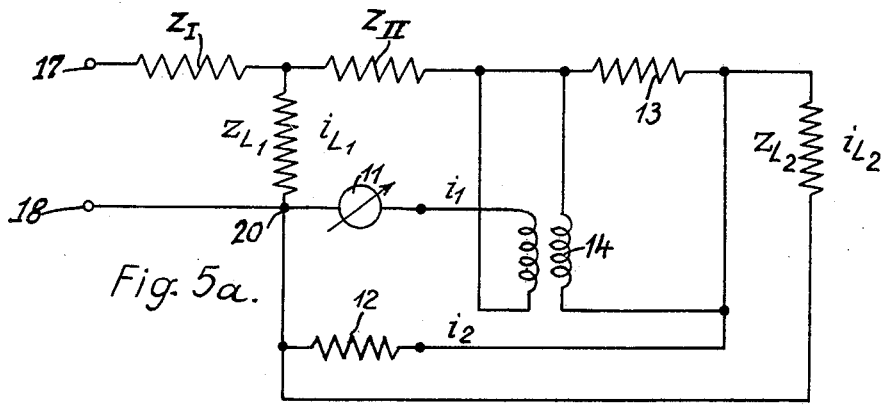
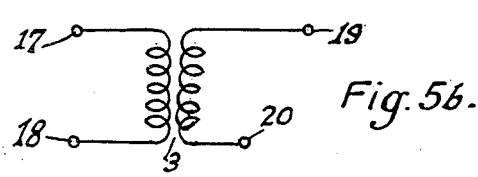
Hans Poleck
Inventor
by Patented Nov. 7, 1939

2,178,645

UNITED STATES PATENT OFFICE 2,178,645

MEASURING ARRANGEMENT FOR POTENTIAL TRANSFORMERS

Hans Poleck, Berlin-Siemensstadt, Germany, assignor to Siemens & Halske, Aktiengesellschaft, Siemensstadt, near Berlin, Germany, a corporation of Germany Application August 9, 1937, Serial No. 158,158
In Germany August 8, 1936

12 Claims. (Cl. 171—95)

(Granted under the provisions of sec. 14, act of March 2, 1927; 357 O. G. 5)

My invention relates to an auxiliary arrangement for potential transformers, in particular high precision metering transformers, for simultaneously connecting two measuring circuits of different precision of test.

If two measuring circuits are to be simultaneously connected to a potential transformer, one of which requires a great precision of test, but represents only a small load, whereas the other requires a small precision of test, but represents a greater load, the drawback is presented that both measuring circuits interfere with each other. Since the common secondary voltage of the potential transformer is determined by the voltage drop across the total impedance of the potential transformer owing to the consumption of current in both measuring circuits, the terminal voltage of one measuring circuit varies, if the current consumption in the other measuring circuit varies.

It is an object of my invention to eliminate the above difficulty so as to enable the simultaneous connection of several measuring or control instruments to one potential transformer without causing a disturbing effect of one instrument upon the indications or operations of the other.

In order to further explain the nature of the above-mentioned interferences and their elimination according to my invention, reference is made to the drawings in which Figs. 1a and 1b are of explanatory nature and serve to illustrate the problem underlying the invention, and Figs. 2, 3, 4, 5a and 5b show four different embodiments of the invention, Fig. 5b representing a portion of Fig. 5a in a different way of illustration.

In Fig. 1a the numeral 3 represents a potential transformer having a primary high voltage winding 31 and a secondary low voltage winding 32. The terminals 17 and 18 are, for instance, connected with a high voltage line. Connected to the secondary winding 32 is a measuring instrument 1 for measuring the voltage $e_I$ supplied to the terminals 17 and 18. This instrument represents a very small load and requires a high measuring precision. Connected to winding 32 is, further, a current-consuming device 2, for instance, consisting of a relay responsive to a certain minimum voltage, which represents a much higher load than instrument 1 but requires a smaller operating precision.

The phenomena in the circuit of Fig. 1a will become more apparent if for the sake of easier consideration the actual circuit is replaced by a simplified substitute scheme as shown in Fig. 1b. In this scheme $Z_I$ represents the resistance of the primary winding 31, $Z_2$ the resistance of the secondary winding 32, and $Z_L$ the no-load impedance of transformer 3, i. e. the imaginary total impedance which corresponds to the primary no-load current $i_L$. For the following consideration it may be assumed that the ratio of transformation is 1:1 so that the resistances $Z_I$ and $Z_{II}$ are equal to each other.

In a potential transformer which must have small measuring faults or voltage drops the total voltage drop may be composed of: (1) the voltage drop due to the load currents $i_1+i_2$, i. e., $e'=2.z(i_1+i_2)$ and (2) the voltage drop due to the no-load current $i_L$, i. e., $e''=z.i_L$.

There results, therefore, a total voltage drop $e'+e''=(i_1+i_2)2z+i_L.z$. Consequently, the voltage $e_k$ across the common terminals of the two measuring circuits will be obtained if the voltage drop $e'+e''$ is subtracted from the primary voltage $e_I$. If, for instance, the current consumption $i_2$ increases, the voltage drop increases also and the voltage decreases across the terminals of the other measuring circuit. In order to prevent such interference, it has heretofore been necessary either to employ a potential transformer of such a great capacity that its total impedance may be neglected with respect to the resistance of the measuring circuit, or to connect each of the two measuring circuits to a separate independent potential transformer.

By the present invention it is possible to connect two measuring circuits to a common potential transformer without the measuring circuits interfering with each other. This is accomplished according to the invention by the fact that the secondary circuit, having two current branches forming the two measuring circuits, is provided with an impedance arrangement which is inserted at least in the current branch forming the measuring circuit of smaller precision of test, and in which arrangement a voltage drop is produced which is transmitted inductively to the other branch circuit with such a rated ratio of transformation that the transmitted voltage is equal but in phase opposition to the voltage drop produced in the total impedance of the potential transformer by the current flowing in the circuit of smaller precision of test. If, for instance, a potential transformer for a load of 150 VA presenting a measuring fault of 1% is loaded by one or more current consuming devices, it is possible by the invention to connect to the same transformer still one or more measuring instruments of a greater precision, for instance a meter which consumes about 5 VA and presents a measuring fault of 0.2%, in such a manner that the indication of this high precision instrument is not influenced by the fluctuations of load of the other current consuming devices.

Fig. 2 shows, by way of example, a connection according to the invention in which two branch circuits containing current-consuming devices 1 and 2 of different precision of operation and representing different load currents $i_1$ and $i_2$ respectively, are connected to the secondary winding of a potential transformer 3. Device 1 may, for instance, consist of a high precision metering instrument of low current consumption, and device 2 of a protective or control relay of lower precision and higher current consumption. In both circuits are inserted two resistors $z_1$ and $z_2$ in which the currents $i_1$ and $i_2$ produce voltage drops $e_1$ and $e_2$ respectively. The primary windings of auxiliary transformers 4 and 5 are connected to the resistors $z_1$ and $z_2$ respectively. The secondary winding of the transformer 4 is in the circuit $i_2$ and the secondary winding of the transformer 5 is in the circuit $i_1$. In the secondary winding of the transformer 4 a voltage $e_1'$ is produced corresponding to the voltage drop $e_1$ in the resistor $z_1$ and in the secondary winding of the transformer 5 a voltage $e_2'$ is produced corresponding to the voltage drop $e_2$ in the resistor $z_2$. In this manner the voltage drop $e_1$ is, therefore, inductively transmitted with a given ratio of transmission to the circuit $i_2$ and the voltage drop $e_2$ to the circuit $i_1$. In this case the ratio of transformation is so chosen that the voltage drop $e_1'$ is equal to the voltage drop caused by the current $i_1$, and the voltage drop $e_2'$ is equal to the voltage drop caused by the current $i_2$ in the total impedance of the potential transformer, the secondary windings being so connected that the voltages $e_1'$ and $e_2'$ are transmitted to the corresponding circuits in opposite phase direction.

If now, for instance, the resistance of current-consumer 1 in the measuring circuit $i_1$ remains constant and the resistance of consumer 2 in the measuring circuit $i_2$ decreases so that the current $i_2$ increases, the voltage drop in the secondary winding of transformer 3 increases. However, the secondary voltage $e_2'$ of the same magnitude transmitted to the circuit $i_1$ increases likewise to the same extent so that the voltage drop in the circuit $i_1$ is thereby equalized. Consequently, the voltage $e_{k1}$ in the measuring circuit $i_1$ does not vary. Likewise the terminal voltage $e_{k2}$ in the measuring circuit $i_2$ remains constant upon a variation of the current $i_1$. The behavior of both current consuming devices is as if they were connected independently of each other to separate potential transformers.

The connection may be simplified by inserting a resistor only in the current branch intended for the connection of the measuring circuit of smaller precision of test, in which resistor a voltage drop is produced which is transmitted to the other current branch by a transformer. Such a connection is shown in Fig. 3.

In the branch circuit $i_2$ including a current consuming device 12 of lower precision is inserted an auxiliary impedance 13 which is preferably designed as a reactor. However, under certain circumstances an ohmic resistance is also sufficient. To the impedance 13 is connected the primary winding of an auxiliary transformer 14 whose secondary winding is in the other branch circuit containing a current consuming device 11 of higher precision, for instance a measuring instrument.

The value of the auxiliary impedance 13 may be chosen equal to the total impedance of the potential transformer, and the ratio of transformation of the auxiliary transformer equal to 1:1. If now the load $i_2$ in the branch circuit of low precision device 12 increases, the voltage drop $e_2$ in the impedance 13 increases as well, and the voltage drop $e_2$ is transmitted according to the ratio 1:1 to the circuit of the high precision device 11 so as to equalize the voltage drop. However, another value may also be given to the auxiliary impedance 13. If the value of the impedance 13 is chosen smaller than the total impedance of the potential transformer, the ratio of transformation of the auxiliary transformer 14 must be correspondingly increased in order that the full value of the voltage drop be transmitted again. In this case it is preferable to choose the auxiliary impedance the smaller in proportion to the total impedance of the potential transformer, the smaller the measuring capacity of the current consuming device 11 is, since then the precision of test of the current consuming device 12 is decreased to a lesser degree. In this connection it has been found that the voltage drop in the current consuming device 11 is approximately equal to $$e_k\left(1+\frac{1}{\alpha}\right)$$

and the voltage drop for the current consuming device 12 is approximately equal to $e_k(1+\alpha)$, if $e_k$ is the voltage drop of the testing transformer without this device and $\alpha$ is the ratio—the ratio $\alpha$ being smaller than unity—according to which the auxiliary impedance 13 has been reduced and the ratio of transformation of the auxiliary transformer 14 has been increased.

The connection shown in Fig. 2 may also be simplified by designing the impedances $z_1$ and $z_2$ as parts of a reactor having the function of a transformer as shown in Fig. 4. Here, a winding of a common reactor 9 is inserted in each of the two branch circuits connected with the secondary winding of a potential transformer 6. The reactor 9 has a tap connected to the secondary winding of the transformer 6 and its ends lead to the two branch circuits including the current-consuming devices 7 and 8 respectively. In this case it may be first assumed that the center of the reactor 9 be connected to the secondary winding of the transformer 6. The winding of the reactor is so rated that the voltage drop in the portion of the reactor winding traversed by the current $i_1$ is equal to the voltage drop produced by the current $i_1$ in the total impedance of the potential transformer 6, and the voltage drop $e_2$ in the portion traversed by the current $i_2$ is equal to the voltage drop produced by the current $i_2$ in the total impedance of the potential transformer. It follows that the resistance of each half of the reactor winding must be equal to the total impedance of the current generator.

If $i_1$ is at first equal to $i_2$, $e_1$ is also equal to $e_2$. Assuming, for instance, that the resistance of the current consuming device 8 decreases so that $i_2$ increases, the voltage drop $e_2$ increases also. Since the reactor 9 transforms in the ratio 1:1, the voltage $e_1$ increases also to the same extent, whereby the voltage drop across the terminals of the current consuming device 7 is equalized automatically.

In this case it is assumed that the position of phase when transmitting from one measuring circuit to the other be such that the transmitted voltage is exactly in opposition to the voltage drop to be equalized. This may be attained by known means. To this end, for instance, a suitably rated ohmic resistance may be arranged in parallel relation to one or both sides of the reactor winding 9. It is also possible to provide the reactor 9 with an additional winding which is closed by a suitably rated resistor. Preferably a suitably rated ohmic resistance 10 is parallel-connected to the total winding of the reactor 9.

The same considerations which in the case of the network shown in Fig. 3 led to the conclusion that the auxiliary impedance 13 is to be chosen the smaller in proportion to the total impedance of the potential transformer, the smaller the output in the measuring circuit $i_1$ is, apply also to the network shown in Fig. 4. If, for instance, the current consuming device 7 requires a great precision of test but a small capacity, and the current consuming device 8 requires a small precision of test but a great capacity, the point of junction on the winding of the reactor 9 is preferably so shifted that the portion of the reactor winding lying in the circuit of the current consuming device 8 has less windings than the portion lying in the circuit of the current consuming device 7.

The invention may further be utilized for compensating the no-load current in the primary winding of a potential transformer. To this end an impedance which represents an equivalent of the no-load impedance of the potential transformer may be parallel-connected to the load in that branch of the secondary circuit $e_2$ which has the greater current consumption. Such an embodiment is shown in Fig. 5a by a network similar to that of Fig. 3. The windings of the potential transformer as well as the no-load impedance $z_{L1}$ are schematically shown in a manner corresponding to Fig. 1b, i. e. when actually constructing the network, that portion of Fig. 5a which lies between the four terminals 17, 18, 19 and 20 is to be replaced by the potential transformer 3 shown in Fig. 5b. In Fig. 5a the reference characters 6', 6'' and $Z_{L1}$ represent the resistance of the primary winding, the resistance of the secondary winding, and the total no-load impedance of the potential transformer, respectively.

For balancing the voltage drop produced by the no-load current $i_L$ in the primary winding, an impedance $z_{L2}$ series-connected to the auxiliary impedance 13 is provided on the secondary side in parallel to the load 12, which impedance $z_{L2}$ is so designed and rated as to represent an image or equivalent of the no-load impedance $z_{L1}$. In this manner, a current $i_{L2}$ is produced which is proportional to the no-load current $i_{L1}$. The current $i_{L1}$ produces in the auxiliary impedance 13 a voltage which corresponds to that produced in the primary winding and is transmitted to the circuit $i_1$ so as to balance the no-load current. While in the drawing the current-consuming device of high precision and low current consumption is represented as a measuring instrument, other devices to which the same characterization applies and which also operate responsive to a condition of the primary current of the potential transformer may be used instead. Likewise the second current consumer may consist of any device, for instance a second measuring instrument which is characterized by a higher current consumption and a lower precision, as compared with the first-mentioned current consumer.

I claim as my invention:

1. An alternating current network for operating in different branch circuits at least two current-consuming devices of different operating precision, comprising a potential transformer having its primary winding designed to be connected with an alternating current source and its secondary winding connected with said two branch circuits, in combination with an impedance arrangement connected in the branch circuit including the device of smaller operating precision so as to produce a voltage drop corresponding to the current consumption in said branch circuit and including a coupling with said other branch circuit so as to impart a compensating voltage to said other branch circuit corresponding to said voltage drop, said coupling being designed for counteracting by said imparted voltage the voltage drop in said other branch circuit which is caused by the voltage drop in the total impedance of said potential transformer produced by the current flowing in said first branch circuit.

2. An alternating current network having a common potential transformer for operating a measuring instrument of high precision and low current consumption for measuring magnitudes of the primary current of said potential transformer and a device of lower precision and higher current consumption, said potential transformer having its secondary winding connected with at least two parallel-arranged branch circuits containing said instrument and said device respectively, in combination with an impedance series connected in the branch circuit of said device so as to produce a voltage drop corresponding to the current consumption of said device and including an inductive coupling with the branch circuit of said instrument so as to impart a balancing voltage to said latter circuit in response to said voltage drop, said coupling being designed for compensating by said imparted voltage the voltage drop in said instrument which is caused by the voltage drop in the total impedance of said potential transformer produced by the current flowing through said device.

3. An alternating current network having a common potential transformer for operating a measuring instrument of high precision and low current consumption for measuring magnitudes of the primary current of said potential transformer and a device of lower precision and higher current consumption, said potential transformer having its secondary winding connected with at least two parallel-arranged branch circuits containing said instrument and said device respectively, in combination with an impedance arrangement connected in the branch circuit of said device so as to produce a voltage drop corresponding to the current consumption of said device, and an auxiliary transformer having its primary winding connected with said impedance arrangement and its secondary winding connected with the branch circuit of said instrument, said auxiliary transformer being designed to transmit to said instrument circuit a compensating voltage counteracting in said instrument circuit the voltage drop caused by the current of said device circuit in the total impedance of said potential transformer.

4. An alternating current arrangement comprising a potential transformer, at least two branch circuits arranged in parallel with each other and connected with the secondary winding of said transformer, and a current-consuming device in each of said branch circuits designed to operate in response to conditions of the primary current of said transformer, in combination with two series-connected impedances having their point of connection connected to the secondary winding of said potential transformer, each of said impedances being inserted in one of said two branch circuits, and two auxiliary transformers each having its primary winding connected with one of said branch circuits so as to lie in parallel to the impedance of said branch circuit, the secondary winding of each of said auxiliary transformers being inserted in the branch circuit of the primary winding of the other transformer, and the ratio of transformation of at least one of said auxiliary transformers being so rated that its secondary voltage compensates in the branch circuit including the secondary winding of said auxiliary transformer the voltage drop of the total impedance of said potential transformer caused by the current flowing in the branch circuit connected with the primary winding of said auxiliary transformer.

5. An alternating current arrangement comprising a potential transformer, at least two branch circuits arranged in parallel with each other and connected with the secondary winding of said transformer, and a current-consuming device in each of said branch circuits designed to operate in response to conditions of the primary current of said transformer, one of said devices having a higher precision of response and a lower current consumption than the other device, in combination with an impedance arranged in the branch circuit including the device of smaller precision, and an auxiliary transformer having its primary winding parallel connected with said impedance and its secondary winding inserted in opposite position of phase in the branch circuit of said device of higher precision, so as to effect a counteraction to the interference caused in said latter branch circuit by the current consumption of said former branch circuit.

6. An alternating current arrangement comprising a potential transformer, at least two branch circuits arranged in parallel with each other and connected with the secondary winding of said transformer, and a current-consuming device in each of said branch circuits designed to operate in response to conditions of the primary current of said transformer, one of said devices having a higher precision of response and a lower current consumption than the other device, in combination with an auxiliary impedance series connected in the branch circuit of the device of smaller precision, said auxiliary impedance having a smaller impedance value than the total impedance of said potential transformer, and an auxiliary transformer having its primary winding connected in parallel to said auxiliary impedance and its secondary winding series connected in opposite phase position in the branch circuit of said device of higher precision, the ratio of transformation of said auxiliary transformer being greater than 1:1 in the same proportion as said auxiliary impedance is smaller than said total impedance of said potential transformer.

7. In an arrangement for connecting two measuring circuits to a common potential transformer, a potential transformer having its primary winding designed to be traversed by an alternating current a property of which is to be measured, a magnet core, two series-connected windings arranged on said core, each of said windings being inserted in one of said measuring circuits, the connecting point of said two windings being connected to one pole of the secondary winding of said potential transformer and the impedance of each winding being equal to the total impedance of said potential transformer, and means for reversing the phase position of the voltage transmitted by said windings from one to the other of said measuring circuits.

8. In an arrangement for connecting two measuring circuits to a common potential transformer, a potential transformer having its primary winding designed to be traversed by an alternating current a property of which is to be measured, a magnet core, two series-connected windings arranged on said core, each of said windings being inserted in one of said measuring circuits, the connecting point of said two windings being connected to one pole of the secondary winding of said potential transformer and the impedance of each winding being equal to the total impedance of said potential transformer, and an ohmic resistance connected in parallel to the series connection of said two windings.

9. An alternating current arrangement comprising a potential transformer, at least two branch circuits arranged in parallel with each other and connected with the secondary winding of said transformer, and a current-consuming device in each of said branch circuits designed to operate in response to conditions of the primary current of said transformer, one of said devices having a higher precision of response and a lower current consumption than the other device, in combination with a magnet core having two series-connected windings arranged in said two branch circuits so as to have their connecting point connected with one pole of said secondary winding and their other ends connected with one of said devices, the sum of the impedances of said two windings being equal to the double total impedance of said potential transformer and the winding connected with the device of smaller precision having less turns than the other winding, and phase-biasing means for effecting a phase reversal of the voltages transmitted by said windings from one of said branch circuits to the other.

10. An alternating current arrangement comprising a potential transformer, at least two branch circuits arranged in parallel with each other and connected with the secondary winding of said transformer, and a current-consuming device in each of said branch circuits designed to operate in response to conditions of the primary current of said transformer, one of said devices having a higher precision of response and a lower current consumption than the other device, in combination with an auxiliary impedance inserted in the measuring circuit of smaller accuracy of test, an auxiliary transformer having its primary winding parallel connected to said auxiliary impedance and its secondary winding inserted in opposite position of phase in the branch circuit including said device of higher precision, and an impedance corresponding to the no-load impedance of said potential transformer and being parallel connected to the load in the branch circuit including the device of lower precision.

11. An alternating current network having a common potential transformer for operating a measuring instrument of high precision and low current consumption for measuring magnitudes of the primary current of said potential transformer and a device of lower precision and higher current consumption, said potential transformer having its secondary winding connected with at least two parallel-arranged branch circuits containing said instrument and said device respectively, in combination with a magnet core, two series-connected windings on said core, said windings being arranged in said two branch circuits so as to have their connecting point connected to one pole of said secondary winding and their other ends connected with said measuring instrument and said device respectively, the sum of the impedances of said two windings being equal to the double total impedance of said potential transformer and the winding connected with said device having less turns than the other winding, and phase-biasing means for causing the voltage imparted by said windings to the branch circuit of said instrument to compensate the voltage drop in said latter branch circuit which is produced by the voltage drop in the total impedance of said potential transformer by current flowing through said device.

12. An alternating current network comprising a potential transformer, two parallel-connected branch circuits connected with the secondary winding of said potential transformer, a measuring instrument disposed in one of said branch circuits and designed for measuring a condition of the primary current of said potential transformer, a device connected in said other branch circuit, said device being also designed for operating in response to a condition of said primary current and having a lower precision of response and a higher current consumption than said instrument, in combination with an auxiliary impedance series connected in the branch circuit of said device, an auxiliary transformer having its primary winding parallel connected to said auxiliary impedance and its secondary winding inserted in reversed phase position in the branch circuit of said instrument so as to counteract with respect to said instrument interferences caused by the current consumption in said device, and another impedance dimensioned to correspond with the no-load impedance of said potential transformer and being parallel connected to the branch circuit of said device.

HANS POLECK.